United States Patent [19]

Shimotake et al.

[11] 4,440,837
[45] Apr. 3, 1984

[54] POSITIVE ELECTRODE CURRENT COLLECTOR FOR LIQUID METAL CELLS

[75] Inventors: Hiroshi Shimotake, Hinsdale; Louis G. Bartholme, Joliet, both of Ill.

[73] Assignee: The United States of America as represented by the United States Department of Energy, Washington, D.C.

[21] Appl. No.: 424,112

[22] Filed: Sep. 27, 1982

[51] Int. Cl.$^3$ .................. H01M 4/52; H01M 6/36
[52] U.S. Cl. .................................. 429/112; 429/245; 429/221
[58] Field of Search ............... 429/221, 245, 112

[56] References Cited

U.S. PATENT DOCUMENTS

| | | | |
|---|---|---|---|
| 3,749,603 | 7/1973 | Stringham et al. | 136/6 |
| 4,011,373 | 3/1977 | Kaun et al. | 429/218 |
| 4,172,926 | 10/1979 | Shimotake et al. | 429/112 |
| 4,228,224 | 10/1980 | Heredy et al. | 429/112 |

OTHER PUBLICATIONS

ANL/OEPM 79-14, Annual Report for 1979, Research, Development and Demonstration of Nickel-Iron Batteries for Electric Vehicle Propulsion, pp. 33-37, 1980.

Primary Examiner—Donald L. Walton
Attorney, Agent, or Firm—Robert J. Fisher; Hugh W. Glenn; Michael F. Esposito

[57] ABSTRACT

A current collector for the positive electrode of an electrochemical cell with a positive electrode including a sulfide. The cell also has a negative electrode and a molten salt electrolyte including halides of a metal selected from the alkali metals and the alkaline earth metals in contact with both the positive and negative electrodes. The current collector has a base metal of copper, silver, gold, aluminum or alloys thereof with a coating thereon of iron, nickel, chromium or alloys thereof. The current collector when subjected to cell voltage forms a sulfur-containing compound on the surface thereby substantially protecting the current collector from further attack by sulfur ions during cell operation. Both electroless and electrolytic processes may be used to deposit coatings.

17 Claims, 1 Drawing Figure

POSITIVE ELECTRODE CURRENT COLLECTOR FOR LIQUID METAL CELLS

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to high-temperature, secondary electrochemical cells and batteries of such cells than can be employed as power sources for electric automobiles, storage of energy generated during intervals off-peak power consumption and various other applications. It is particularly applicable to current collectors for electrochemical cells that employ metal sulfides as positive electrode active materials and is particularly useful with electrochemical cells that have a positive electrode containing an iron sulfide as an active material.

The type of electrochemical cells contemplated are those that include the metal sulfides as the positive electrode reactant while the negative electrodes may include lithium in the form of solid alloys such as lithium aluminum alloys. These cells employ molten salt electrolytes generally including the halides of the alkali metals and possibly the alkali metal earths. A combination of individual salts permits reduced melting points and lower operating temperatures, and examples of these types of cells are well known in the art.

Current collectors in the forms of thin sheets, meshes, fiber compacts and the like have long been used to decrease the electrode resistance. Ideally, an electrochemical cell must maintain high power performance for the entire range of the state of charge. However in practice, a cell shows declining power characteristics as the discharge progresses due to increasing cell resistance. Some cells show more rapidly rising cell resistance than others, thus lowering specific power even where the weight of the current collectors are similar. Such difference of cell resistance comes partly from the difference in the current distribution in the electrode plates containing different current collectors. If a poorly conducting current collector is used in an electrode, the results are not only high cell resistant but also a subsequent rapid rise in cell resistance due to poor current distribution, which results in non-uniform utilization of the cell active material. Accordingly, it is important to design a current collector which gives low cell resistance as well as uniform current distribution.

SUMMARY OF THE INVENTION

It is an object of the present invention to provide an improved current collector for an electrochemical cell.

It is also an object to provide a current collector with low cell resistance and uniform current distribution even if the current collector surface area exceeds 35 square inches per side.

It is a further object of the present invention to provide an electrochemical cell comprising a positive electrode including a sulfide, a negative electrode, a molten salt electrolyte including halides of a metal selected from the alkali metals and the alkaline earth metals in contact with both the positive and negative electrodes, the positive electrode having a current collector selected from the group consisting of copper, aluminum, silver, gold and alloys thereof with a coating thereon selected from the group consisting of iron, nickel, chromium and alloys thereof, whereby the current collector when subjected to cell voltage forming a sulfur-containing compound on the surface thereof thereby substantially protecting the current collector from further attack by sulfur ions during cell operation.

Yet another object of the present invention is to provide a positive electrode including a sulfide, a negative electrode, a molten salt electrolyte including halides of a metal selected from the alkali metals and the alkaline earth metals in contact with both the positive and negative electrodes, the positive electrode having a current collector selected from the group consisting of copper, aluminum and alloys thereof with an iron coating thereon deposited electrolytically on the current collector from an iron chloride bath, whereby the current collector when subjected to cell voltage forming a sulfur-containing compound on the surface thereof thereby substantially protecting the current collector from further attack by sulfur ions during cell operation.

A still further object of the present invention is to provide a current collector having a metal base selected from the group consisting of copper, aluminum, silver, gold and alloys thereof with a coating thereon selected from the group consisting of iron, nickel, chromium and alloys thereof, and electrical terminal means connected to the metal base, whereby the current collector when subjected to cell voltage in an electrochemical cell having a sulfide-containing positive electrode forming a sulfur-containing compound on the surface thereof thereby substantially protecting the current collector from further attack by sulfur ions during cell operation.

Yet a final object of the present invention is to provide a current collector having a metal base selected from the group consisting of copper, aluminum and alloys thereof with an iron coating thereon deposited electrolytically on the metal base from an iron chloride bath, and electrical terminal means connected to the metal base, whereby the current collector when subjected to cell voltage in an electrochemical cell having a sulfide-containing positive electrode forming a sulfur-containing compound on the surface thereof substantially protecting the current collector from further attack by sulfur ions during cell operation.

These and other objects of the present invention may be more readily understood when taken in conjunction with the following specification and drawing in which:

DETAILED DESCRIPTION OF THE PREFERRED EMBODIMENT

Figure 1:
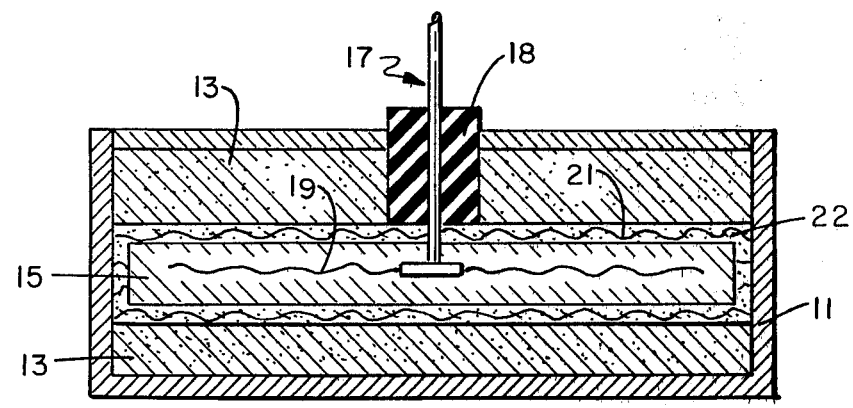
FIG. 1 is a cross sectional view of an electrochemical cell.

A cell container housing 11 is illustrated with two negative electrodes 13 disposed on either side of a positive electrode 15. Electrical terminal means 17 surrounded by a suitable insulator 18 provides electrical access to a current collector structure 19 within the positive electrode 15. The positive electrode 15 and the negative electrodes 13 are separated by an electrically insulative separator material 21 which in the operating cell is permeated with a molten electrolytic salt 22.

The cell container or housing 11 may be any metal which is substantially nonreactive with the cell constituents but preferably is stainless steel. The inner electrode separator 21 can be a cloth, fabric, felt, porous layers of entangled fibers porous ceramic or merely layers of electrically insulative powder. The material used for the electrically insulative separator 21 is one which is compatible with the cell reactants at cell operating temperatures and can include such materials as boron nitride, yttria, magnesium oxide, calcium oxide and various other high-temperature insulative materials. The negative electrodes 13 can be provided in a number of forms by a number of methods. The negative electrode 13 can comprise pressed aluminum wires, fibers or particles that contain a stainless steel grid or screen to enhance current collection. Other negative electrode types schematically illustrated at the electrodes 13 of the present invention can be provided by immersing porous or foamed metal substrates into a metal of aluminum or lithium-aluminum alloy or perhaps a lithium silicon alloy. Preferably the negative electrodes 13 are assembled with excess or additional lithium with respect to the positive electrode 15, as is well known. The electrolyte which provides ion transfer between the anodes 13 and the cathode 15 are preferably selected from the halides of the alkali and alkali earth metals. Various well-known salts such as lithium chloride-potassium chloride eutectics can be used or lithium chloride-lithium chloride-potassium bromide as well as other electrolytic salts listed in U.S. Pat. No. 3,488,221 to Shimotake et al. are acceptable.

The current collector 19 is preferably made from a base metal having one or more metals deposited thereon. Base metals suitable for use as current collectors in the present invention include copper, aluminum, silver, gold and alloys thereof. The base metal for the current collector 19 should be as good an electrical conductor as possible. The problem with using current collectors solely of the aforementioned metals in a positive electrode containing sulfur is that the sulfur ion attacks the current collector resulting in the increased cell resistance mentioned above with the resultant decrease in cell performance.

It has been found that coating the base metal current collector with a thin coating of a metal selected from the group consisting of iron, nickel, chromium and alloys thereof results in rendering the current collector resistant to sulfide iron attack after a cell voltage has trode, or for that matter other electrodes selected from the class consisting of good conducting materials such as copper, aluminum, silver, gold and alloys thereof by various means including sputtering as well as plating baths. Where a plating bath is used to deposit iron, two principal baths are available. An iron sulfate bath can be used to deposit a thin layer of iron on a copper substrate, but the deposits are usually brittle. Where an iron chloride bath is used, the deposits are usually ductile particularly where the bath is operated at a temperature somewhat greater than about 85° C. Because ductile deposits are preferred for current collectors, the chloride bath is preferred. A typical bath used to deposit an iron coating on a current collector selected from one of the named metals above includes:

| | |
|---|---|
| $FeCl_2 \cdot 4H_2O$ | 400 g/l |
| $MnCl_2$ | 30 g/l |
| $AlCl_3$ | 20 g/l |

The addition of the manganese chloride ($MnCL_2$) and aluminum chloride ($AlCl_3$) are found to improve ductility of the deposit. Typical plating conditions are as follows:
Anode: Armco Iron Sheet
Current Density: 24 mA/cm$^2$
pH: 1.6–1.8
Temperature: 85° C.

As is customary in the plating art, the object to be plated whether it be copper, aluminum, silver, gold or alloys thereof must be cleaned by the normal and customary pretreatment methods which generally include degreasing and perhaps electropolishing. Although typical commercially available iron chloride plating baths contain calcium chloride, we have found that superior ductile iron chloride deposits are obtained when the calcium chloride is omitted and the magnesium and aluminum chlorides set forth above are included. Preferably, there is more magnesium chloride than aluminum chloride and the total amount of magnesium chloride and aluminum chloride are slightly greater than about 10 percent of the iron chloride in the bath.

TABLE I

| | Summary of Cell Characteristics for R-Series Cells | | | | | | | | | |
|---|---|---|---|---|---|---|---|---|---|---|
| Cell Designation | R-60 | R-61 | R-62 | R-63 | R-64 | R-65 | R-67 | R-68 | R-69 | R-70 |
| Current Collector Material | Fe | Fe | Ni | Fe | Fe | Fe-16 mil Cu | Fe | Fe-16 mil Cu | Al | Fe-10 mil Cu |
| Pos. Electrode Capacity, A-hr | 100 | 144 | 140 | 65 | 72 | 72 | 158 | 72 | 82 | 175 |
| Cycle Life | 245 | >306 | 311 | 149 | >340 | >232 | >123 | >116 | 10 | >2 |
| Life Time, Days | 112 | >191 | 166 | 56 | >130 | >116 | >87 | >58 | 10 | >3 |
| Specific Power, W/kg | | | | | | | | | | |
| 10% Discharge | | 74.9 | 78.1 | | 96 | 167 | | | | |
| 50% Discharge | | 50.8 | 45.8 | | 83 | 89 | | | | |
| 80% Discharge | | 41.6 | 34.6 | | 71 | 88 | | | | |
| (at the nth cycle) | | (34) | (17) | | (39) | (15) | | | | |
| Specific Energy, V-hr/kg | | 64.1 | 63.4 | | 73.1 | 79.3 | | | | |
| Peak Power/Energy Ratio W/Wh @ 50% DOD | | 0.79 | 0.72 | | 1.13 | 1.17 | | | | |
| Cell Weight, kg | | 1.80 | 1.77 | 1.18 | 1.20 | 1.12 | 1.83 | 1.16 | 1.24 | 1.83 | been applied to the current collector resulting in the plated metal being converted to a sulfide containing compound which passivates the current collector base metal to further sulfide attack.

Table I below shows certain cell characteristics for a series of cells wherein cell R-65 included a current collector in the positive electrode consisting of a 16 mil sheet of copper having iron deposited thereon from a chloride bath. Iron may be plated onto the copper elec- In preparing the different current collectors set forth in Table I above, it has been found that current collectors comprising a good conducting base material such as copper, aluminum, silver, gold and alloys thereof provided with a coating selected from iron, nickel, chromium, and alloys thereof in all instances provide superior specific power as evidenced by the current collector designated R-65.

Cell R-80, not reported in Table I, was a lithium aluminum/iron sulfide cell with a current collector made of a copper sheet plated with nickel on which an additional thin iron layer was plated. The cell contained Ohno's electrolyte with lithium-aluminum chloride LiAlCl$_4$ applied to the boron nitride felt separator. This cell was tested and was found to perform satisfactorily with improved performance being attributed to the current collector.

In cell R-79, the lithium aluminum-iron sulfide cell was constructed using a nickel current collector as in cell R-47 but in cell R-79, the nickel was plated with a thin layer of iron. The nickel electrode was cathodically protected by the iron, but as nickel is not as good a conductor as copper, the specific power as well as the specific energy and the peak powers of this cell were not as good as cell R-65.

Cell R-77 was a lithium aluminum-iron sulfide cell having a copper sheet current collector with protective metal layers. The copper sheet was 16 mils square having a 0.41 milimeter thickness first electrolessly plated with a thin layer of nickel on which a second layer of nickel was plated electrolytically from a chloride bath, the two nickel layers totalling about 4 mils thickness. The advantage of the electroless plating is to provide complete coverage of the substrate with a nickel layer which generally contains approximately 3–15 percent by weight of phosphorus resulting from the use of a hypophosphite solution in the process. U.S. Pat. No. 2,658,839, issued Nov. 10, 1953 to Talmey et al., U.S. Pat. No. 2,694,019 issued Nov. 19, 1954 to Gutzeit and, U.S. Pat. No. 3,211,578 issued Oct. 12, 1965 to Gutzeit. The disclosures of these patents being incorporated herein by reference. The second layer laid down by the electrolytic process is a pure nickel layer. The nickel plated sheet of copper is further plated with a one mil thickness of iron in the aforementioned chloride bath. This cell performed satisfactorily and upon examination after prolonged trials, the current collectors were found to be substantially protected from sulfide attack or corrosion.

Using the method of the present invention current collectors have been constructed having surface areas in the neighborhood of 35 square inches per side and current collectors may be constructed having surface areas in the neighborhood of 150 square inches per side. In all cases, current collectors are obtained having superior conducting capabilities over prolonged periods, provided that the current collector is not subjected to corrosive attack. Corrosive attack in a sulfide environment is prevented by plating iron or other passivating metals such as nickel, chromium or alloys thereof onto the current collector surface. In all cases the passivating metal plated on to the surface of the current collector metal base substrate should be of a thickness completely to cover the metal substrate and generally is in the neighborhood of about 10 to about 20 mils in thickness. If too much passivating metal is plated or otherwise applied to the surface of the current conductor metal base, then the conductivity of the base metal is diminished with respect to cell performance and the cell resistance increases and non-uniform use of the cell active material results.

Where the passivating metal is iron and the electrolyte contains sulfide, there is formed on the surface of the current collector when the cell voltage is applied a sulfide material which is the actual passivating surface. The sulfide material is either iron sulfide or a material called J-phase or a combination thereof. It is believed that J-phase has the following chemical formula: LiK$_6$Fe$_{24}$S$_{26}$Cl and perhaps what is actually formed on the surface of the iron plate is a combination of iron sulfide and the J-phase. In any event the surface of the iron plated material becomes passive to further sulfide attack and hence the current collector is protected against corrosion due to the presence of sulfur ion in the electrolyte.

The current collector of the present invention is not needed in the negative electrode because lithium present in the anode will preferentially combine with any sulfur ion present to form lithium sulfide thereby protecting the metal base of the current collector. Accordingly, it is seen that the subject invention is particularly applicable to positive electrodes of electrochemical cells wherein the cell active material in the cathode contains sulfur such as in an iron sulfide positive electrode.

While there has been described what at present is considered to be the preferred embodiment of the present invention, it will be apparent to those skilled in the art that various modifications and alterations may be made therein without departing from the true spirit and scope of the present invention, and it is intended to cover in the claims appended hereto all such modifications and alterations.

The embodiments of the invention in which an exclusive property or privilege is claimed are defined as follows:

1. An electrochemical cell comprising a positive electrode including a sulfide, a negative electrode, a molten salt electrolyte including halides of a metal selected from the alkali metals and the alkaline earth metals in contact with both said positive and negative electrodes, said positive electrode having a current collector selected from the group consisting of copper, aluminum and alloys thereof with an iron coating thereon deposited electrolytically on said current collector from an iron chloride bath, whereby said current collector when subjected to cell voltage forming a sulfur-containing compound on the surface thereof thereby substantially protecting said current collector from further sulfur ions during cell operation.

2. The electrochemical cell of claim 1, wherein said coating has a thickness in the range of between about 10 and about 20 mils.

3. The electrochemical cell of claim 1, wherein said chloride bath is maintained at a temperature of not less than about 85° C. during the deposition of iron.

4. The electrochemical cell of claim 1, wherein said iron chloride bath contains FeCl$_2$.

5. The electrochemical cell of claim 1, wherein said iron chloride bath contains FeCl$_2$ and MnCl$_2$.

6. The electrochemical cell of claim 1, wherein said iron chloride bath contains iron chloride and AlCl$_3$.

7. The electrochemical cell of claim 1, wherein said iron chloride bath contains FeCl$_2$ MnCl$_2$ and AlCl$_3$.

8. The electrochemical cell of claim 7, wherein said iron chloride bath contains a greater amount of magnesium chloride than magnesium chloride.

9. The electrochemical cell of claim 7, wherein said iron chloride bath contains a ratio of magnesium chloride and aluminum chloride to iron chloride slightly greater than 1 to 10.

10. A current collector for an electrochemical cell comprising a metal base selected from the group consisting of copper, aluminum and alloys thereof with an iron coating thereon deposited electrolytically on said metal base from an iron chloride bath, and electrical terminal means connected to said metal base, whereby said current collector when subjected to cell voltage in an electrochemical cell having a sulfide-containing positive electrode forming a sulfur-containing compound on the surface thereof thereby substantially protecting said current collector from further attack by sulfur ions during cell operation.

11. The current collector of claim 10, wherein said chloride bath is maintained at a temperature of not less than about 85° C. during the deposition of iron.

12. The current collector of claim 10, wherein said iron chloride bath contains $FeCl_2$.

13. The current collector of claim 10, wherein said iron chloride bath contains $FeCl_2$ and $MnCl_2$.

14. The current collector of claim 10, wherein said iron chloride bath contains $FeCl_2$ and $AlCl_3$.

15. The current collector of claim 10, wherein said iron chloride bath contains $FeCl_2$, $MnCl_2$ and $AlCl_3$.

16. The current collector of claim 15, wherein said iron chloride bath contains a greater amount of aluminum chloride than magnesium chloride.

17. The current collector of claim 15, wherein said iron chloride bath contains a ratio of magnesium chloride and aluminum chloride to iron chloride slightly greater than 1 to 10.

* * * * *